United States Patent
Mischel

[15] 3,692,337
[45] Sept. 19, 1972

[54] FLEXIBLE COUPLING
[72] Inventor: Howard T. Mischel, San Diego, Calif.
[73] Assignee: AVICA Corporation, Middletown, R.I.
[22] Filed: Sept. 4, 1970
[21] Appl. No.: 69,660

Related U.S. Application Data
[63] Continuation-in-part of Ser. No. 822,958, May 8, 1969, Pat. No. 3,574,354.

[52] U.S. Cl. ................................. 285/226, 285/299
[51] Int. Cl. ........................................... F16l 27/10
[58] Field of Search ...... 285/226, 227, 228, 229, 299, 285/300, 301

[56] References Cited

UNITED STATES PATENTS

| | | | |
|---|---|---|---|
| 2,014,355 | 9/1935 | Hussman | 285/226 |
| 2,196,676 | 4/1940 | Johnson et al. | 285/226 |
| 3,169,785 | 2/1965 | Ziebold | 285/226 |
| 3,438,657 | 4/1969 | Torres | 285/382.4 X |
| 1,726,483 | 8/1929 | Giesler | 285/300 X |
| 2,485,370 | 10/1949 | Dreyer | 285/228 |
| 282,967 | 8/1883 | Duffy | 285/226 |

FOREIGN PATENTS OR APPLICATIONS

| | | | |
|---|---|---|---|
| 866,411 | 5/1941 | France | 285/226 |
| 609,137 | 11/1960 | Canada | 285/226 |

*Primary Examiner*—Andrew V. Kundrat
*Attorney*—John G. Blair

[57] ABSTRACT

The disclosed flexible coupling is joining sections of rigid conduit, with provision for angular, axial and lateral flexiblity, and static sealing against fluid leakage. The conduit sections are interconnected by a tubular metal bellows which has the shape of a truncated cone for applications requiring increase fatigue life. The bellows is secured to ferrules either welded or swaged to the conduit ends. An E-seal, O-ring or similar seal is provided in a recess in one ferrule abutting the end of the metal bellows to provide a sealing means which does not flex despite lateral, axial and angular flexure of the bellows. The bellows is secured to the respective ferrules by a coupling nut at one end and by welding at the other end. In an alternate embodiment the said other end of the bellows is swaged in place between the ferrule and the conduit section.

10 Claims, 6 Drawing Figures

PATENTED SEP 19 1972

INVENTOR.
Howard T. Mischel
BY
Blair, St. Onge & Meyers
ATTORNEYS.

INVENTOR.
Howard T. Mischel

INVENTOR.
Howard T. Mischel

FLEXIBLE COUPLING

CROSS REFERENCE TO RELATED APPLICATION

This is a continuation-in-part of application Ser. No. 822,958, filed May 8, 1969 and now U.S. Pat. No. 3,574,354.

BACKGROUND OF THE INVENTION

Flexible couplings for rigid conduit such as pipe or ducting are widely used in applications requiring flexible joints to absorb expansion or contraction due to temperature change and/or stresses due to vibration, impact, acceleration and the like. Flexible couplings also permit a degree of leeway during installation so that precise dimensional control of components is not needed. One common application of flexible couplings is in connecting rigid components of aircraft fuel and pneumatic systems.

Prior art flexible couplings, however, have suffered from several disadvantages. One shortcoming has been in the degree of flexibility afforded. Some couplings have permitted only axial movement, others only lateral or angular movement. For aircraft and similar uses however, it is desirable to have a degree of flexibility in axial, angular and lateral directions, i.e., substantially universal flexibility to compensate for both expansion and contraction, dimensional imperfections and expected and unexpected stresses due to shock and acceleration.

Another problem arises with respect to the seals which are used in the flexible coupling to prevent leakage of the fluid in the system. In prior art couplings these seals have been of the dynamic type, that is, they have had to flex along with the coupling. However, the requirement of flexibility is a limiting factor. It is difficult if not impossible to find sealing materials which retain their sealing qualities and also their flexibility over a wide range of temperatures and for extended periods. Loss of resilience due to temperature, aging and fatigue have caused so-called dynamic seals to be unreliable and therefore a "weak link" in the conduit system.

Also, prior flexible couplings of the type containing bellows are often subject to early fatigue failure in the bellows. This is believed due to the fact that flexure is often substantially confined to one or the other ends of the bellows. Accordingly relatively few of the bellows convolutions bear the entire brunt of stress cycling.

Additionally, prior art flexible couplings have often been complicated, bulky and heavy, and therefore difficult to install and repair.

Accordingly, representative objects of the present invention are to provide an efficient flexible coupling for rigid conduit which is universally flexible, resistant to fatigue failure, which has static seals, which is small, lightweight, easy to install and repair, and which is simply constructed and economical to manufacture.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

SUMMARY OF THE INVENTION

The present invention relates to a flexible coupling for rigid conduit and more particularly to a flexible coupling permitting axial, angular and lateral flexibility and providing for increased fatigue life and static sealing against fluid leakage.

The coupling comprises a tubular, flexible metal bellows secured to ferrules welded, swaged or otherwise secured to adjacent ends of the conduit sections to be joined. The metal bellows provides an effective means of achieving relative axial angular and lateral flexibility between conduit sections while providing continuity of flow through the conduit.

For increased fatigue life the metal bellows is provided in the shape of a truncated cone. This is done by gradually decreasing the outer diameter of successive convolutions toward one end of the bellows. Since the smaller diameter convolutions are more resistant to flexure, that end of the bellows is then positioned at the area of maximum stress in the coupling. Accordingly, the stress tends to be more evenly distributed along the bellows and flexure tends to occur over the entire bellows length rather than being confined to the most highly stressed end. This is believed to be the mechanism which leads to greater fatigue life in the coupling of the invention, although the invention is not to be limited to any specific theory of operation.

The bellows is preferably secured to the respective ferrules by a pair of rings which are mounted in opposite end convolutions of the bellows; one, a welding ring, is preferably formed in two halves so as to be readily insertable in one end convolution. The welding ring is then welded to an abutment on one ferrule to secure that end of the bellows in place. The other ring is urged against its ferrule by a coupling nut which screws onto the ferrule. Sufficient clearance is left between mating parts of the coupling so that a desired amount of axial, angular and lateral flexing can occur.

The construction of the flexible coupling makes assembly relatively simple. The bellows with its pair of rings and the ferrule to which the welding ring is attached may be provided as a prefabricated sub-assembly. Assembly then comprises welding, swaging or otherwise securing the ferrule on the sub-assembly to one conduit segment, similarly securing the other ferrule to the opposite conduit segment and then completing the coupling by screwing on the coupling nut.

The coupling may also be provided with static fluid seals preferably comprising flexible metal seals or O-rings recessed in the ferrule surfaces abutting the bellows ends. Since the seals are static, that is, undergo substantially no flexing during either axial or angular flexure of the bellows, they are highly reliable and long lasting. Moreover, the problem of maintaining seal flexibility at elevated or low temperatures, and over long periods of use is greatly reduced since the seals undergo substantially no flexing.

The structure of the invention also provides a more compact and lightweight coupling, further simplifying assembly and disassembly and enhancing its use in applications such as aircraft.

BRIEF DESCRIPTION OF THE DRAWINGS

For a fuller understanding of the nature and objects of the invention, reference should be had to the following detailed description taken in conjunction with the accompanying drawings, in which.

Similar reference characters refer to similar parts throughout the several views of the drawings.

DESCRIPTION OF THE PREFERRED EMBODIMENTS

Figure 1:
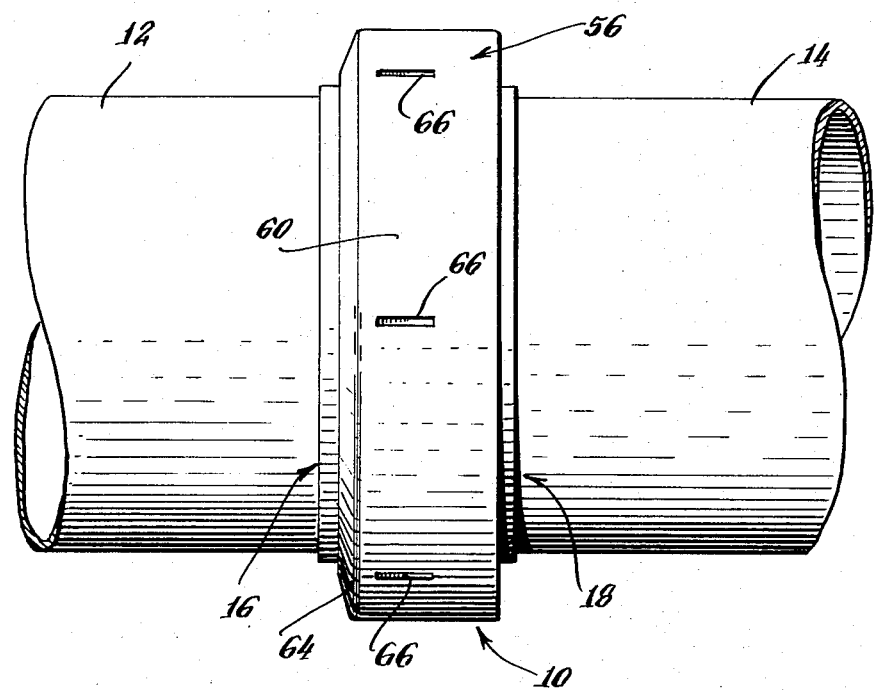
FIG. 1 is a side elevation view of the flexible coupling of the invention joining two sections of rigid cylindrical pipe.
Figure 2:
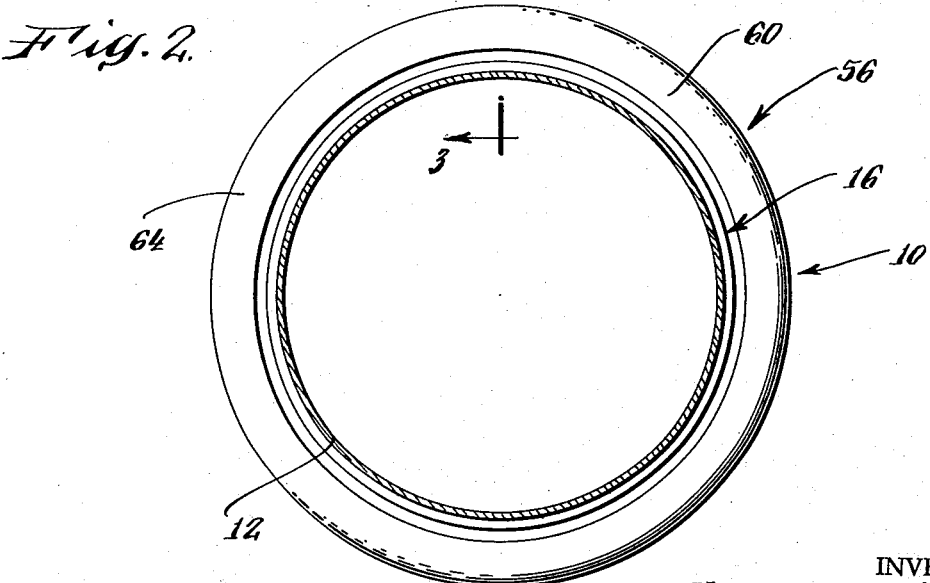
FIG. 2 is a left end view of the coupling of FIG. 1.

Referring now to FIG. 1, the flexible coupling 10 of the invention is shown interconnecting two segments 12 and 14 of cylindrical pipe conduit. It can be seen, however, that various types and shapes of conduit can be joined by flexible coupling 10 and it is not intended that the invention be limited to a cylindrical pipe coupling.

Figure 3:
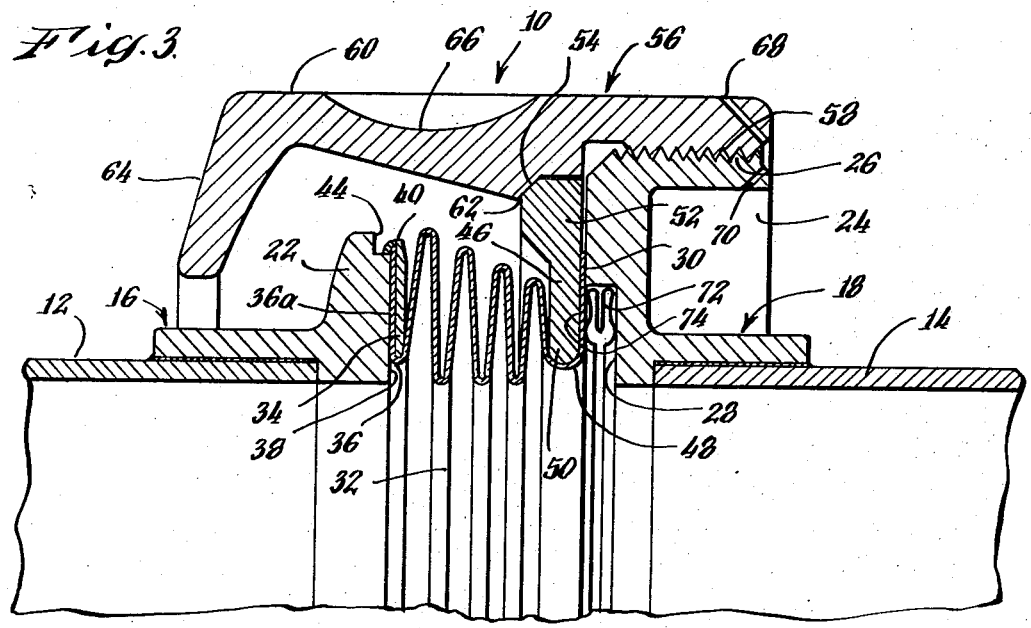
FIG. 3 is an enlarged, partial sectional view of the coupling taken along line 3—3 of FIG. 2.
Figure 4:
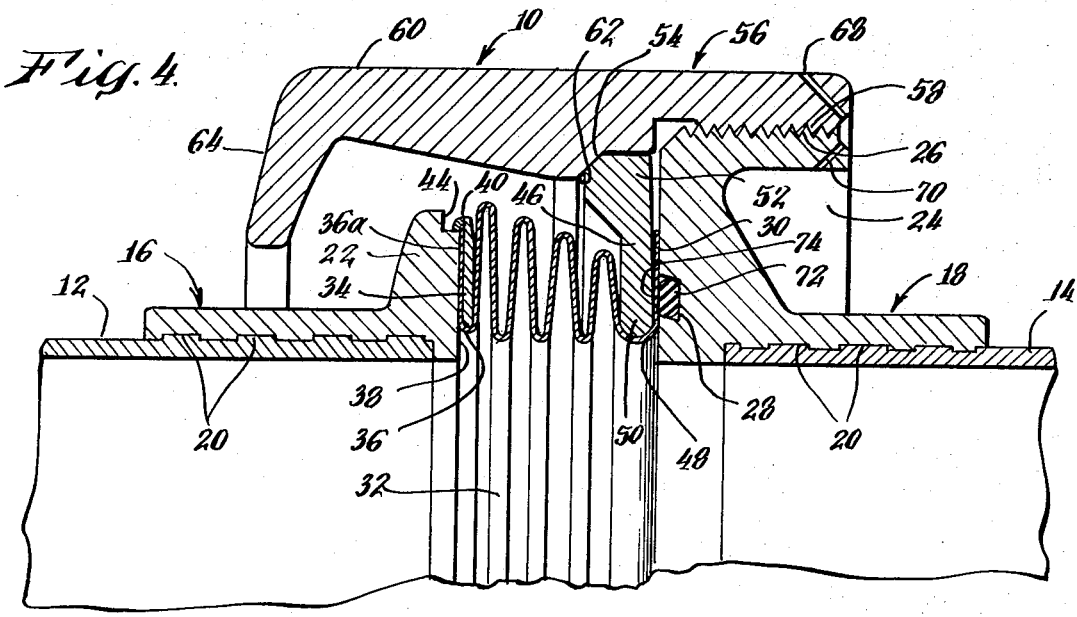
FIG. 4 is an enlarged, partial sectional view of another embodiment of the coupling shown in FIG. 3 wherein the ferrules are swaged to the underlying conduit sections.

As shown in FIG. 3, coupling 10 comprises a pair of ferrules 16 and 18 affixed to respective adjacent ends of conduit 12 and 14. Ferrules 16 and 18 may be secured to the conduit ends by welding as shown. Alternatively, the ferrules may be secured by swaging as shown in FIG. 4, and for this purpose are provided with interior grooves 20. Upon swaging, grooves 20 interlock with the surface of the conduit as shown in FIG. 4 to form a secure and fluid tight connection. For other applications, ferrules 16 and 18 may be secured by a brazed, soldered, threaded or sweated joint, or the like.

Ferrule 16, herein termed a female ferrule, is provided with an upstanding abutment 22 adjacent the open end of its conduit segment 12. Ferrule 18, herein termed a screw adapter ferrule, differs from ferrule 16 in that it is provided with a larger diameter upstanding flange 24 adjacent the open end of its respective conduit segment 14. Flange 24 is also preferably threaded on its outer peripheral surface 26. Ferrule 18 is further provided with an annular recess 28 on its surface 30. Recess 28 forms part of a static seal for preventing fluid leakage from the interior of the conduit as is more fully discussed hereinafter.

The two segments 12 and 14 of the conduit are interconnected by a tubular member which is flexible in axial, angular and lateral directions. Preferably, as shown in the drawings, the flexible tubular connector comprises a metal bellows 32. The material from which bellows 32 is formed and the number of convolutions therein may vary depending upon the material conveyed by the conduit, the operating conditions, and the degree of flexibility desired.

Figure 6:
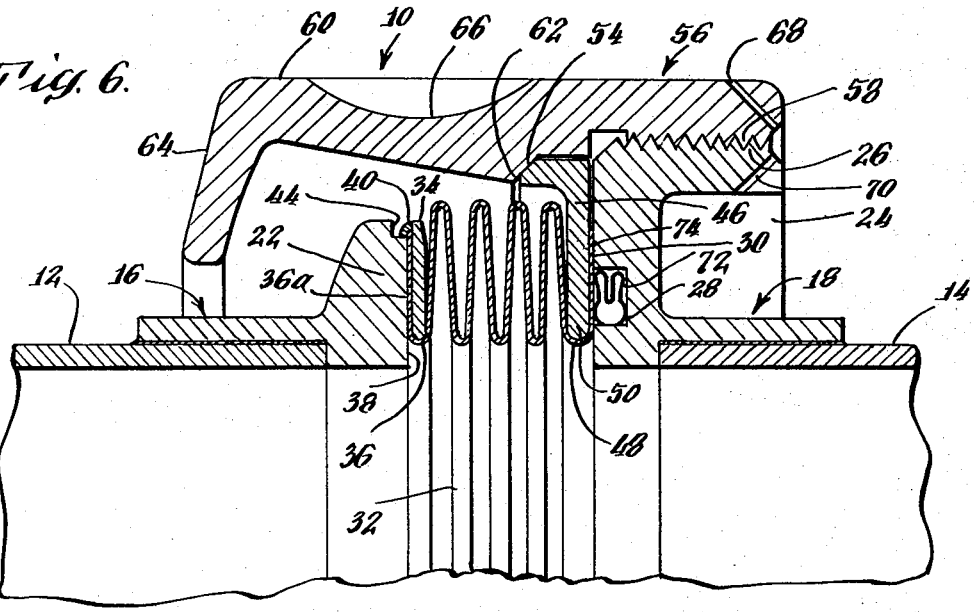
FIG. 6 is an enlarged, partial sectional view of another embodiment of the coupling shown in FIG. 3.

As shown in FIG. 6, bellows 32 may be of a conventional type wherein the convolutions are all equal in diameter. As previously discussed, however, such a bellows construction may be subject to early fatigue failure and accordingly is preferably used in applications where the stress levels are low.

Most preferably bellows 32 takes the form of a truncated cone as shown in FIGS. 3 and 4. The truncated cone shape is the result of a decrease in the outer diameter of successive bellows convolutions looking from left to right in the drawings. It will be noted however that the inner diameters of the bellows convolutions remain equal so as to provide a substantially constant diameter passage for the flow of fluid through the coupling. As previously discussed, the provision of a bellows in the form of a truncated cone increases the fatigue life thereof by causing stresses and flexure to be more evenly distributed over the length of the bellows.

Bellows 32 is secured at one end to ferrule 16 by means of a welding ring 34 as shown in FIGS. 3, 4 and 6. Welding ring 34 is annular and preferably formed in two semicircular portions to facilitate the mounting thereof within the last convolution 36 at one end of bellows 32. Once mounted in convolution 36, welding ring 34 is pressed against the flat surface 38 of abutment 22, clamping the bellows end 36a therebetween. While held in this position, the tapered outer periphery 40 of ring 34 is then welded to abutment 22, most commonly by an arc welding procedure, to fixedly secure that end of the bellows to ferrule 16. Preferably an annular cut-out 44 is provided on the surface of abutment 22 adjacent outer periphery 40 of welding ring 34. The purpose of cut-out 44 is to separate the bulk of abutment 22 from the weld area so that it does not act as a heat sink and adversely affect the quality of the weld. The welded end of bellows 32 thus forms a static, fluid tight connection to ferrule 16.

Still referring to FIGS. 3, 4 and 6 a second ring 46 is mounted in the last convolution 48 at the opposite end of bellows 32. Ring 46 is preferably mounted by bending convolution 48 around the inner diameter flange 50 thereof. Accordingly, ring 46 need not be split or formed in two parts as is welding ring 34. The outer diameter portion 52 of ring 46 is thickened and provided with a beveled surface 54 to cooperate with the mating surface of a coupling nut in order to secure that end of bellows 32 in place.

As heretofore discussed, bellows 32 with ferrule 16 secured to one end by welding ring 34, and with ring 46 mounted at the other end within convolution 48, may be prefabricated as a complete sub-assembly. This simplifies final assembly of the coupling, and permits maintenance of a supply of such sub-assemblies as replacements should the coupling be damaged or otherwise fail.

Coupling nut 56 completes the assembly of flexible coupling 10 as shown in FIGS. 3, 4 and 6. Nut 56 preferably comprises a threaded interior portion 58 which is threaded over the corresponding threaded portion 26 of ferrule 18. A skirt portion 60 extends from threaded portion 58 and acts as a protective cover over the bellows 32. A beveled surface 62 is provided at the interior of nut 56 between threaded portion 58 and skirt 60. It can be seen that as coupling nut 56 is threaded onto ferrule 18, beveled portion 62 engages the beveled surface 54 of ring 46 urging it against surface 30 of ferrule 18 to secure bellows 32 in position between conduit segments 12 and 14. Alternatively, nut 56 may be secured to ferrule 18 by clamping or bolting.

Protective skirt 60 terminates in an overhanging lip 64 which further protects the interior of the flexible coupling from damage due to foreign objects. It is important however, that sufficient clearance be left both between lip 64 and abutment 22, and between lip 64 and the welded or swaged portion of ferrule 16 so that a desired amount of axial, angular and lateral movement can occur between conduit segments 12 and 14. The clearance provided for this purpose can be clearly seen in FIGS. 3, 4 and 6.

As shown in FIGS. 1, 3 and 6 the outer surface of coupling nut 56 may be provided with a plurality of indentations 66 which will accommodate a spanner wrench for purposes of tightening nut 56. Alternatively, as with the embodiments shown in FIGS. 4 and 5, the outer surface of coupling nut 56 may be knurled or otherwise roughened to facilitate manual threading thereof. Additionally or alternatively, the outer surface of skirt 60 may be knurled or roughened for manual threading.

Once in position, coupling nut 56 is preferably lockwired in place to prevent its accidentally being loosened. For this purpose a pair of drilled through holes 68 and 70 are provided in adjacent portions of coupling nut 56 and the flange 24 of ferrule 18 (FIGS. 3-6). After assembly of coupling 10, a lockwire (not shown) may be threaded through holes 68 and 70 and twisted to secure the assembly.

The flexible coupling may also be provided with sealing means adjacent ring 46 to prevent fluid leakage from inside the conduit. As shown in FIGS. 3—6, a flexible sealing member 72 is placed within the annular recess 28 in ferrule 18. For high pressure applications member 72 preferably comprises a flexible metal seal having the configuration shown in FIGS. 3 and 6 or some other suitable configuration. The metal seal may be plated with silver and is given sufficient flexibility for static sealing under operating conditions. Alternatively, for lower pressure applications, member 72 is preferably an O-ring (FIG. 4). For some applications a gasket or similar suitable static seal may be used.

As shown in the drawings, when flexible coupling 10 is assembled the end 74 of bellows 32 is pressed tightly against member 72 to form an effective seal. Significantly, it can be seen that despite any axial, angular or lateral flexure which bellows 32 may undergo, member 72 is not required to flex, and undergoes no further distortion than that due to the pressure exerted during assembly.

Member 72 in place in recess 28 thus forms a static sealing means. Since substantially no flexure is required of member 72 in use, the problems due to loss of flexibility from aging, temperature change and fatigue common in dynamic seals is essentially eliminated. The coupling of the invention is therefore highly attractive for use in cryogenic and very high temperature environments. Prior art flexible couplings have not been useful in these environments because the dynamic seals thereof have lacked sufficient resiliency at these extreme temperatures.

Although associated with a dynamic member, that is bellows 32, the seal formed by member 72 is as reliable as any other static seal in the conduit system, such as that in a rigid pipe joint. Further, the expense due to seal maintenance and replacement common to prior art structures is to a large degree eliminated by the present invention.

Figure 5:
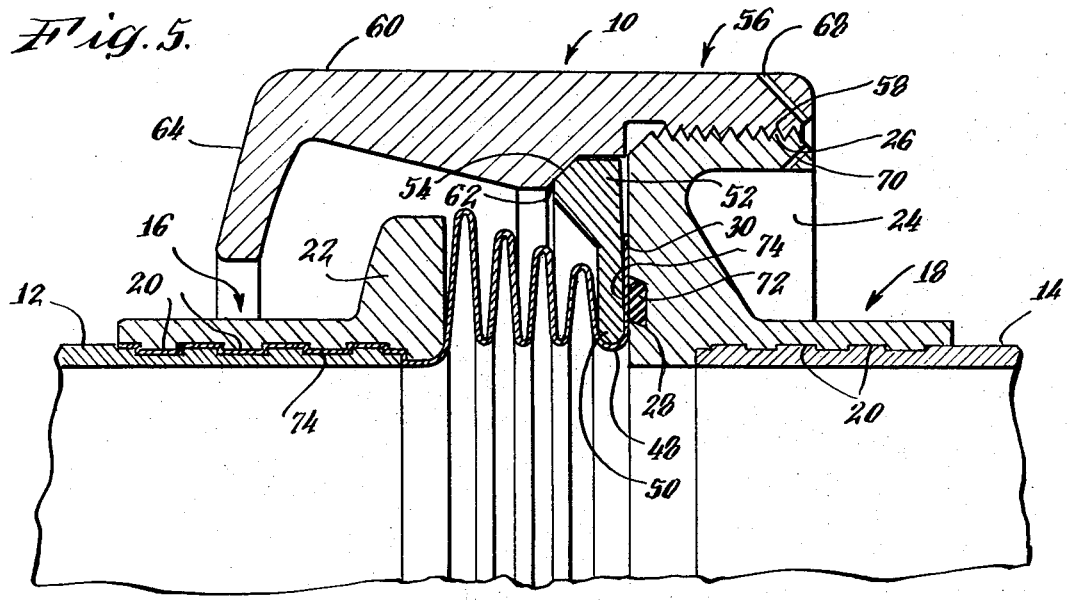
FIG. 5 is an enlarged, partial sectional view of another embodiment of the coupling shown in FIG. 4 wherein one end of the bellows is swaged between a ferrule and the underlying conduit section.

Another embodiment of the invention is shown in FIG. 5. The embodiment of FIG. 5 is substantially identical in all respects to the embodiment of FIG. 4 except for the elimination of the welding ring and the cutout portion of abutment 22. Instead of being welded in place by means of a welding ring, the left end 74 of bellows 32 as shown in FIG. 5 is made somewhat longer and extended out perpendicular to the convolutions. End 74 is then placed between conduit segment 12 and ferrule 16 and the three members swaged together as shown. The swaged joint between segment 12, ferrule 16 and bellows end 74 is, like the welded connection previously discussed, fluid tight. Alternatively to the bellows shape shown, a more conventional bellows of the type shown in FIG. 6 may be used in the embodiment of FIG. 5. Although the right end of bellows 36 in the embodiment of FIG. 6 is sealed in the same manner as the right end in the embodiments of FIGS. 3, 4 and 6, it will be understood that this end may also be swaged between ferrule 18 and conduit segment 14 is desired.

As in the previously discussed embodiments, sufficient clearance is left in the embodiment of FIG. 5 between overhanging lip 64 and abutment 22 of ferrule 16, and between lip 64 and the swaged portion of ferrule 16 so that a desired amount of axial, angular and lateral movement can occur between conduit segments 12 and 14.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A flexible coupling for rigid conduit comprising, in combination:

A. flexible tubular connector means comprising a tubular bellows,

B. a pair of ferrules mounted to adjacent ends of a pair of conduit segments connected by said coupling comprising a female ferrule having an upstanding abutment and secured to the end of one said conduit segment, and a screw adapter ferrule secured to the end of the other said conduit segment, and C. fastening means for securing each end of said bellows to said ferrules and providing clearance for relative axial, angular and lateral movement between said conduit segments comprising, 1. an annular welding ring mounted in one end convolution of said bellows adjacent said female ferrule, said welding ring being welded to said abutment with a portion of said one end convolution clamped therebetween, 2. a second ring mounted within the other end convolution of said bellows adjacent said screw adapter ferrule, and a coupling nut threadedly engaged on said screw adapter ferrule and bearing against said second ring to urge said second ring and associated end convolution against a surface of said screw adapter ferrule, said second ring and coupling nut having engaging complementary surfaces at the position where said nut bears against said second ring.

2. A flexible coupling as defined in claim 1 wherein said tubular bellows has the shape of a truncated cone.

3. A flexible coupling as defined in claim 1 including an annular recess in the surface of said screw adapter ferrule which bears against said adjacent end convolution, and a sealing member in said recess forming a static seal against fluid leakage during flexure of said bellows.

4. A flexible coupling as defined in claim 3 wherein said sealing member comprises a flexible metal seal.

5. A bellows sub-assembly for use in a flexible coupling comprising, in combination:
   A. flexible tubular connector means comprising a tubular bellows,
   B. a female ferrule having an upstanding abutment,
   C. an annular welding ring mounted in one end convolution of said bellows and being welded to said abutment with a portion of said one end convolution clamped therebetween, and
   D. a second ring mounted within the opposite end convolution of said bellows, said second ring having a surface thereon adapted to engage with a complementary surface of a coupling nut when said sub-assembly is incorporated into said flexible coupling.

6. A bellows sub-assembly as defined in claim 5 wherein said bellows has the shape of a truncated cone.

7. A flexible coupling for rigid conduit comprising, in combination:
   A. flexible tubular connector means comprising a tubular bellows,
   1. said bellows having convolutions of decreasing outer diameter toward an end thereof to distribute stress and improve fatigue life,
   B. a pair of ferrules mounted to adjacent ends of a pair of conduit segments connected by said coupling, the ferrule at one end being a screw adapter,
   C. fastening means for securing each end of said bellows to said ferrules and providing clearance for relative axial, lateral and angular movement between said conduit segments, said fastening means at said one end comprising a ring mounted within the corresponding end convolution of said bellows, and a coupling nut threadedly engaged on said screw adapter ferrule and bearing against said ring to urge said ring and bellows convolution against a surface of said screw adapter ferrule, said ring and said coupling nut having engaging complementary surfaces at the position where said nut bears against said ring, the other ferrule at the other conduit segment end comprising a female ferrule having an upstanding abutment, said fastening means at said other end comprising an annular welding ring mounted in the opposite end convolution of said bellows and being welded to said abutment with a portion of said opposite end convolution clamped therebetween, and
   D. sealing means between said ring and said screw adapter ferrule forming a static seal against fluid leakage from within said conduit, said static seal remaining static during flexure of said bellows.

8. A flexible coupling as defined in claim 7 including a cut-out in the surface of said abutment adjacent said weld to improve weld quality.

9. A flexible coupling as defined in claim 7 wherein said welding ring is formed in two pieces to facilitate mounting in said opposite end convolution.

10. A flexible coupling for rigid conduit comprising, in combination:
   A. flexible tubular connector means comprising a tubular bellows,
   1. said bellows having convolutions of decreasing outer diameter toward an end thereof to distribute stress and improve fatigue life,
   B. a pair of ferrules mounted to adjacent ends of a pair of conduit segments connected by said coupling, the ferrule at one end being a screw adapter,
   C. fastening means for securing each end of said bellows to said ferrules and providing clearance for relative axial, lateral and angular movement between said conduit segments, said fastening means at said one end comprising a ring mounted within the corresponding end convolution of said bellows, and a coupling nut threadedly engaged on said screw adapter ferrule and bearing against said ring to urge said ring and bellows convolution against a surface of said screw adapter ferrule, said ring and said coupling nut having engaging complementary surfaces at the position where said nut bears against said ring, said screw adapter ferrule having an annular recess in its surface which bears against the said end convolution of said bellows, said sealing means comprising a flexible metal seal mounted in said recess and forming said static seal against fluid leakage during flexure of said bellows, and
   D. sealing means between said ring and said screw adapter ferrule forming a static seal against fluid leakage from within said conduit, said static seal remaining static during flexure of said bellows.

* * * * *